United States Patent [19]

Kimura

[11] Patent Number: 5,265,048
[45] Date of Patent: Nov. 23, 1993

[54] SEMICONDUCTOR STORAGE DEVICE AND METHOD OF ACCESSING THE SAME

[75] Inventor: Masatoshi Kimura, Hyogo, Japan

[73] Assignee: Mitysubishi Denki Kabushiki Kaisha, Tokyo, Japan

[21] Appl. No.: 640,745

[22] Filed: Jan. 14, 1991

[30] Foreign Application Priority Data

Mar. 5, 1990 [JP] Japan .................................. 2-054007

[51] Int. Cl.⁵ .......................... G06F 9/36; G06F 12/06
[52] U.S. Cl. ........................... 365/189.01; 365/230.01
[58] Field of Search ...................... 365/189.01, 189.02, 365/230.01

[56] References Cited

U.S. PATENT DOCUMENTS 4,571,706  2/1986  Iwahashi et al. ..................... 365/200
4,718,044  1/1988  Matsuyama ..................... 365/230.05

FOREIGN PATENT DOCUMENTS

55-67994  5/1980  Japan .
1-134632  5/1989  Japan .
1-163835  6/1989  Japan .

Primary Examiner—Eugene R. LaRoche
Assistant Examiner—Viet Q. Nguyen
Attorney, Agent, or Firm—Lowe, Price, LeBlanc & Becker

[57] ABSTRACT

The storage area of a memory cell array is divided into a main area and auxiliary areas. The main area has a large storage capacity as compared with the auxiliary areas, and stores ordinary processed data and the like. The auxiliary areas store any desired identification data. The address spaces of the main area and auxiliary areas overlap each other. That is, the access to the auxiliary areas is effected by using part of the address inputs used for addressing the main area. Area switching means allows the use of time sharing for the memory cell array by switching accessible storage areas between the main area and auxiliary areas.

8 Claims, 11 Drawing Sheets

| $\overline{CE}$ | $\overline{WE}$ | $\overline{OE}$ | MODE | DATA INPUT/ OUTPUT | Icc | |
|---|---|---|---|---|---|---|
| H | X | X | UNSELECTED | HIGH IMPEDANCE | STAND-BY | NORMAL MODE |
| L | L | H | WRITING | INPUT | OPERATION | |
| L | H | L | READING | OUTPUT | OPERATION | |
| L | H | H |  | HIGH IMPEDANCE | OPERATION | |
| L | ⊓_⌐ | ⊓_⌐ | SWITCHING BETWEEN AUXILIARY AND MAIN AREAS | HIGH IMPEDANCE | OPERATION | SWITCHING MODE |

FIG.11

| $\overline{CE}$ | $\overline{OE}$ | $\overline{WE}$ | MODE | DATA INPUT/OUTPUT | |
|---|---|---|---|---|---|
| L | L | H | READING | OUTPUT | NORMAL MODE |
| H | X | X | STAND-BY | HIGH IMPEDANCE | |
| L | H | L | WRITING | INPUT | |
| L | 12.5±0.5V | L | INPUT | INPUT = H | |
| X | X | H | WRITING INHIBITED | DEPENDING ON INPUT CONDITIONS | |
| X | L | H | WRITING INHIBITED | DEPENDING ON INPUT CONDITIONS | |
| L | ⊓⊔ | ⊔⊓ | SWITCHING BETWEEN AUXILIARY AND MAIN AREAS | HIGH IMPEDANCE | SWITCHING MODE |

FIG.13

| $\overline{CE}$ | $\overline{OE}$ | $\overline{BYTE}$ | MODE | DATA INPUT/OUTPUT | | |
|---|---|---|---|---|---|---|
| | | | | $D_0 - D_7$ | $D_8 - D_{20}$ | |
| L | L | L | READING | OUTPUT | HIGH IMPEDANCE | NORMAL MODE |
| L | L | H | READING | OUTPUT | OUTPUT | |
| H | X | X | STAND-BY | HIGH IMPEDANCE | HIGH IMPEDANCE | |
| L | ⊓⊔ | ⊔⊓ | SWITCHING BETWEEN AUXILIARY AND MAIN AREAS | HIGH IMPEDANCE | HIGH IMPEDANCE | SWITCHING MODE |

FIG.12

| $\overline{CE}$ | $\overline{OE}$ | $\overline{PGM}$ | Vpp | Vcc | MODE | DATA INPUT/ OUTPUT | |
|---|---|---|---|---|---|---|---|
| L | L | X | 5 V | 5 V | READING | OUTPUT | NORMAL MODE |
| L | H | X | 5 V | 5 V | OUTPUT DISENABLE | HIGH IMPEDANCE | |
| H | X | X | 5 V | 6 V | STAND-BY (POWER DOWN) | HIGH IMPEDANCE | |
| L | H | L | 12.5V | 6 V | WORD PROGRAM | INPUT | |
| L | L | H | 12.5V | 6 V | PROGRAM VERIFY | OUTPUT | |
| H | L | H | 12.5V | 6 V | PAGE DATA LATCH | INPUT | |
| H | H | L | 12.5V | 6 V | PAGE PROGRAM | HIGH IMPEDANCE | |
| L | L | L | 12.5V | 6 V | PROGRAMMING INHIBITED | HIGH IMPEDANCE | |
| L | H | H | 12.5V | 6 V | | | |
| H | L | L | 12.5V | 6 V | | | |
| H | H | H | 12.5V | 6 V | | | |
| L | ⎴⎵⎴ | ⎴⎵⎴ | 5 V | 5 V | SWITCHING BETWEEN AUXILIARY AND MAIN AREAS | HIGH IMPEDANCE | SWITCHING MODE |

SEMICONDUCTOR STORAGE DEVICE AND METHOD OF ACCESSING THE SAME

BACKGROUND OF THE INVENTION

1. Field of the Invention

This invention relates to a semiconductor storage device, such as a static RAM (Random Access Memory), dynamic RAM, EPROM (Electrically Programmable Read-Only memory), OTPROM (One Time Programmable Read-Only Memory), masked ROM, or EEPROM (Electrically Erasable Programmable Read-Only Memory) and particularly it relates to a semiconductor storage device suitable for memory card circuit assemblies and also to a method of accessing the same.

2. Description of the Background Art

As is known in the art, in memory cards such as IC cards, the card substrate is provided with a semiconductor storage device. It has been necessary for such semiconductor storage device to store, besides usual processed data, various identification data (memory capacity, type, access speed, card serial number, data of production, stored contents of the card, code number, etc.). Heretofore, among the known methods of storing such identification data have been the following.

(1) To store identification data in part of the memory without increasing the storage capacity of the memory (2) To extend the storage capacity of the memory to store identification data in the extended portion, (3) To provide an auxiliary memory besides the main memory, so as to store identification data in the auxiliary memory.

The conventional methods described above, however, have problems pointed out below.

(1) Usually, since the storage area of the memory is used to capacity, it often happens that there is no storage space left for storing identification data. Therefore, the above method (1) is hard to realize.

(2) As in the above (2), when the storage capacity of the memory is extended, the number of address inputs also has to be increased. As a result, the number of signal lines and the number of pins are increased, leading to an increase in the chip size of the semiconductor storage device. Further, an increase in the number of pins raises a problem that interchangeability with the existing standardized semiconductor storage devices is spoiled.

(3) Usually, the amount of identification data ranges from tens to hundreds of bytes. However, such auxiliary memory of small capacity is usually not included in the standards such as 256K bits, 1M bits and 4M bits, it can hardly be mass-produced, leading to an exorbitant price. Therefore, the method which relies on the provision of a separate auxiliary memory as in the above (3) leads to a great increase in cost.

SUMMARY OF THE INVENTION

An object of the invention is to provides a semiconductor storage device capable of storing various data (for example, identification data) besides ordinary processed data, without incurring an increase in chip size or cost and without spoiling interchangeability with existing standardized semiconductor storage devices.

Another object of the invention is to provide a method of accessing a semiconductor storage device by switching between overlapping regions of a memory cell array in a time sharing manner by using the same address inputs.

A semiconductor storage device according to the invention is provided with a memory cell array composed of a plurality of regularly arranged memory cells. The storage area of this memory cell array is divided into a main area of relatively large storage capacity and auxiliary areas of relatively small storage capacity. The main area is accessed by using first address inputs. The auxiliary areas are accessed by using second address inputs which are part of the first address inputs. Further, area switching means is provided for selecting an accessible area from the main and auxiliary areas.

In this invention, the main and auxiliary areas present in one memory cell array are accessed in a time sharing manner. And the access to the auxiliary areas is effected by using part of the first address inputs used for the main area. Therefore, the memory cell array can be extended without increasing the number of address inputs.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First, referring to FIG. 1, the principle of this invention will be described. A memory cell array 1 is composed of a plurality of regularly arranged memory cells. The storage area of the memory cell array 1 is divided into a main area 2 and auxiliary areas 3a and 3b. The main area 2 is used to store processed data. The auxiliary areas 3a and 3b are used to store data different from ordinary processed data, for example, identification data described above. Therefore, the storage capacity of the auxiliary areas 3a and 3b is much smaller than that of the main area 2 (for example, it is as small as tens to hundreds of bytes). The main area 2 is accessed by using address inputs through an address bus ADB. The auxiliary areas 3a and 3b are accessed by using part of the address inputs used for accessing the main area. Therefore, as shown in FIG. 2, the space of the main area 2 is in overlapping relation to the spaces of the auxiliary areas 3a and 43b. That is, the main area 2 is accessed by using address inputs A0 - An, while the auxiliary areas 3a and 3b are accessed by using Ao - Ai and Ak - An ($i<k$), which are part of the address inputs A0 - An. Therefore, in the main area 2, the address space portions corresponding to the address inputs $Ai+1-1$ are the portion which does not overlap the address spaces of the auxiliary areas 3a and 3b.

Area switching means 4 is used for the switching of accessible areas between the main area 2 and auxiliary areas 3a and 3b. That is, the area switching means 4 makes the access to the auxiliary areas 3a and 3b possible when the selection signal line L1 is activated and the selection signal line L2 inactivated and, reversely, it makes the access to the main area 2 possible when the selection signal line L1 is inactivated and the selection signal line L2 activated. As will be later described, an area accessible with a predetermined timing is switched from the auxiliary areas 3a and 3b to the main area 2. This is because identification data to be stored in the auxiliary areas 3 and 3b are often read into the terminal unit in the initial state.

Figure 3:
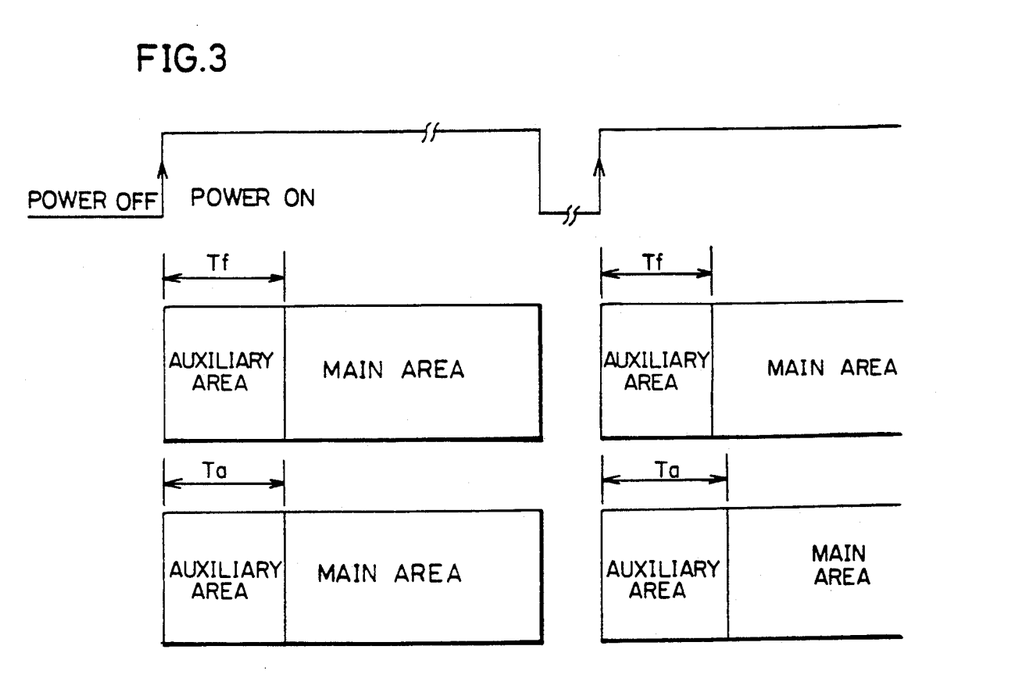
FIG. 3 is a view for explaining the timing for switching from the auxiliary areas to the main area.

Referring to FIG. 3, timing for switching from the auxiliary areas 3a and 3b to the main area 2 will be described. As shown in FIG. 3, switching from the auxiliary areas 3a and 3b to the main area 2 may be effected a fixed time Tf or an optional time Ta after the turning-on of the power. Said fixed time Tf is sufficient for the terminal unit to read out the stored contents of the auxiliary areas 3a and 3b. If the optional time Ta is selected for the switching of areas, this is advantageous in that the timing for switching can be controlled from the terminal unit.

Figure 1:
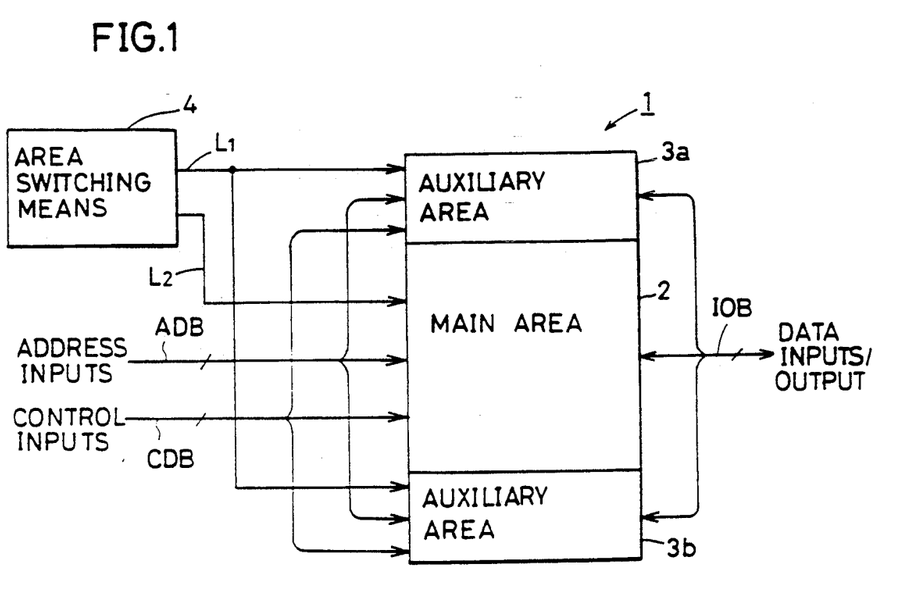
FIG. 1 is a view for explaining the principle of the invention.
Figure 2:
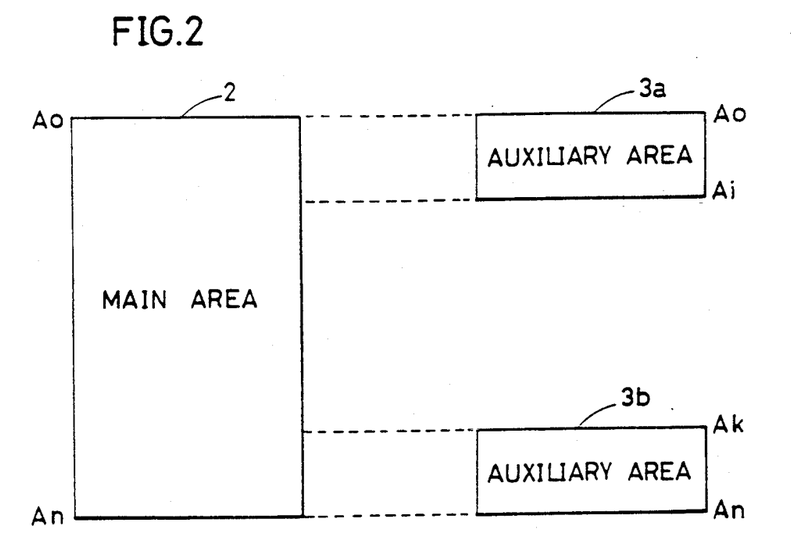
FIG. 2 is a view showing the overlapping of main and auxiliary areas in the principle view in FIG. 1.

In addition, in FIG. 1, the control data given through the control data bus CDB are used for controlling the timing for both the writing and the reading of data in and from the memory cell array 1. Further, the inputting and outputting of data into and from the main area 2 and auxiliary areas 3a and 3b are effected through the inputs/outputs data bus IOB.

As has so far been described, the access to the auxiliary areas 3a and 3b is effected using part of the address inputs used for accessing the main area 2; therefore, even if the storage capacity of the memory cell array 1 is extended to provide the auxiliary areas 3a and 3b, there is no possibility of incurring an increase in the number of bits of address inputs. As a result, there is no possibility of incurring an increase in the number of signal lines or in the number of pins; there is no increase in the chip area. Further, interchangeability between the presented semiconductor storage device and existing standardized ones can be maintained. And since the main area 2 and auxiliary areas 3a and 3b are used in a time sharing manner by being switched by the area switching means 4, there is no possibility of their being simultaneously accessed.

It is to be noted that the provision of the auxiliary areas 3a and 3b of tens to hundreds of bytes by extending the storage capacity of an ordinary standardized semiconductor memory (for example, a semiconductor memory of 256K bits, 1M bits, or 4M bits) can be realized very easily without substantially changing the conventional semiconductor manufacturing process.

Figure 4:
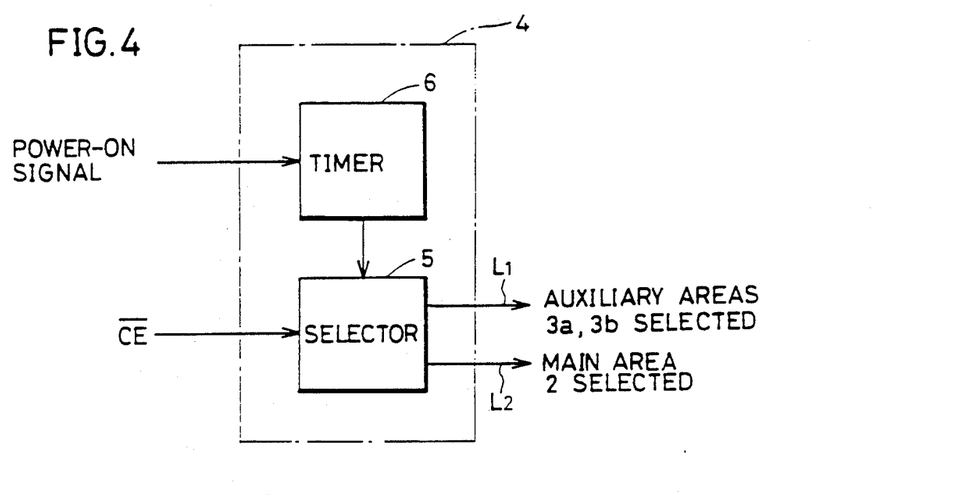
FIG. 4 is a view showing a first example of the arrangement of area switching means.
Figure 5:
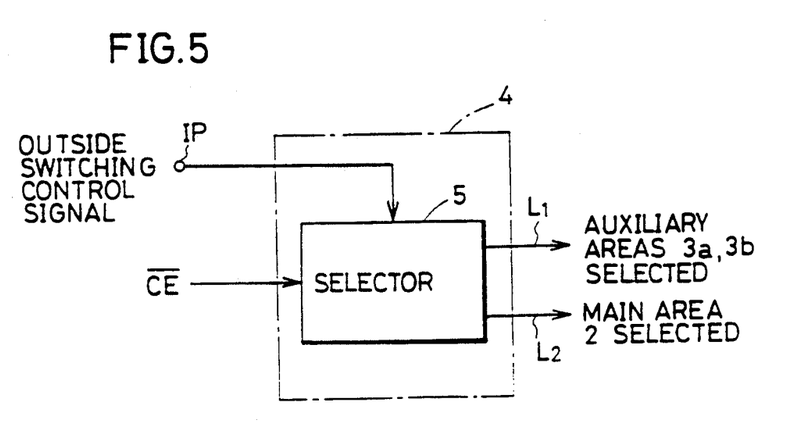
FIG. 5 is a view showing a second example of the arrangement of the area switching means.
Figure 6:
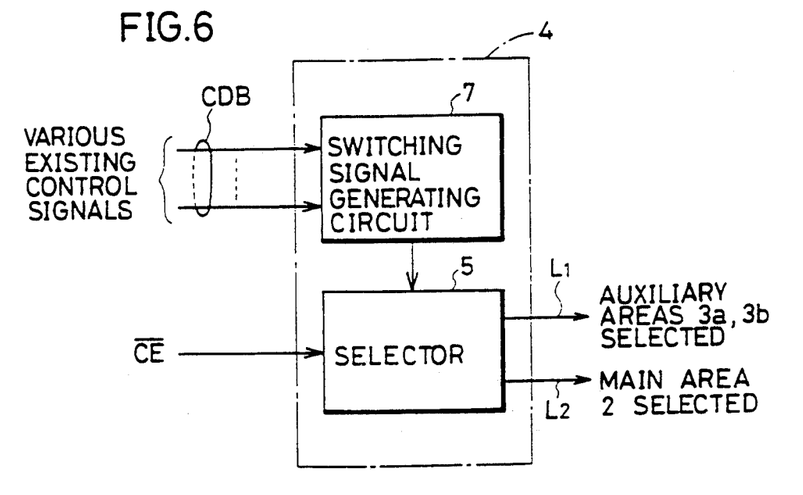
FIG. 6 is a view showing a third example of the arrangement of the area switching means.

Now referring to FIGS. 4 through 6, some examples of the arrangement of the area switching means 4 will be described. In addition, FIG. 4 shows an example of the arrangement of the area switching means for the switching of areas a fixed time Tf after the turning-on of the power. FIGS. 5 and 6 show an example of the arrangement of the area switching means adapted for the switching of areas an optional time Ta after the turning-on of the power.

In FIG. 4, the area switching means 4 comprises a timer 6 and a selector 5. The timer 6 is given a power-on signal which rises when the power is turned on. When this power-on signal rises, the timer starts clock operation and upon passage of the fixed time Tf after the turning-on of the power, the timer 6 gives a time-up signal to the selector 5. The selector 5 is given a chip enable signal $\overline{CE}$ coming from outside the semiconductor storage device. This chip enable signal $\overline{CE}$ is a part of the control data used to control the operation of the semiconductor storage device. Before a time-up signal is outputted from the timer 6, that is, before the fixed time Tf passes after the turning-on of the power, the selector 5 introduces the chip enable signal $\overline{CE}$ to the selection signal line L1 and makes the other selection signal line L2 inactive.

Therefore, before the fixed time Tf passes after the turning-on of the power, the auxiliary areas 3a and 3n alone are accessible. After the fixed time Tf has passed since the turning-on of the power, a time-up signal is delivered from the timer 6. In response to this time-up signal, the selector 5 gives a chip enable signal $\overline{CE}$ to the selection signal line L2, inactivating the selection signal line L1. Thereby, the accessible area is switched from the auxiliary areas 3a and 3b to the main area 2. The area switching means 4 in FIG. 4 is capable of switching the accessible area from the auxiliary areas 3a and 3b to the main area 2 the fixed time Tf after the turning-on of the power.

The area switching means 4 shown in FIG. 5 is composed of a selector 5 alone. The selector 5 is given a switching control signal through a signal input pin IP. That is, the semiconductor chip equipped with this semiconductor storage device is provided with the signal input pin IP, to which a switching control signal is given from outside the semiconductor chip. The switching control signal is an exclusive signal for giving a command for the switching of accessible areas. In the initial state after the turning-on of the power, the selector 5 gives a chip enable signal $\overline{CE}$ to the selection signal line L1, and selects the auxiliary areas 3a and 3b as accessible areas. And when a switching signal is given an optional time Ta after the turning-on of the power, the selector 5 gives a chip enable signal $\overline{CE}$ to the selection signal line L2, and selects the main area 2 as an accessible storage area. That is, the accessible storage area is switched from the auxiliary areas 3a and 3b to the main area 2. Thus, the switching of accessible storage areas can be effected an optional time Ta after the turning-on of the power by a switching signal given from outside the semiconductor chip.

The area switching means 4 shown in FIG. 6 is composed of a switching signal generating circuit 7 and a selector 5. The switching signal generating circuit 7 is various control signals through the control data bus CDB. These control signals are known signals used in ordinary semiconductor devices. The switching signal generating circuit 7 generates a switching signal which these control signals form a predetermined logical combination which is not used in the normal mode. Before said switching signal is given after the power has been turned on, the selector 5 gives a chip enable signal $\overline{CE}$ to the selection signal line L1 and selects the auxiliary areas 3a and 3b as accessible storage areas. When the selector 5 is given a switching signal from the switching signal generating circuit 7, it gives a chip enable signal $\overline{CE}$ to the selection signal line L2 and selects the main area 2 as an accessible storage area. Therefore, the area switching means 4 of FIG. 6, like the area switching means 4 of FIG. 5, is capable of controlling the timing for the switching of accessible storage areas from outside the semiconductor chip, and effects the switching of areas an optional time Ta after the turning-on of the power. Further, since the area switching means 4 of FIG. 6 effects the switching of areas by utilizing control signals used in ordinary semiconductor storage devices, there is no need for providing a signal input pin IP as in the case of the area switching means 4 of FIG. 5. Therefore, the area switching means 4 of FIG. 6 has no possibility of incurring an increase in the number of signal input pins.

This invention is applicable to various semiconductor storage devices such as a static RAM, dynamic RAM, EPROM, OTPROM, masked ROM, and EEPROM. And the type of control signals to be used differ with the type of semiconductor storage devices to which the invention is applied. Therefore, the switching signal generating circuit 7 shown in FIG. 6 detects the timing for switching by using different control signals corresponding to the type of semiconductor storage devices. Area switching means used in various semiconductor storage devices will now be described with reference to FIGS. 7 through 9.

Figure 7:
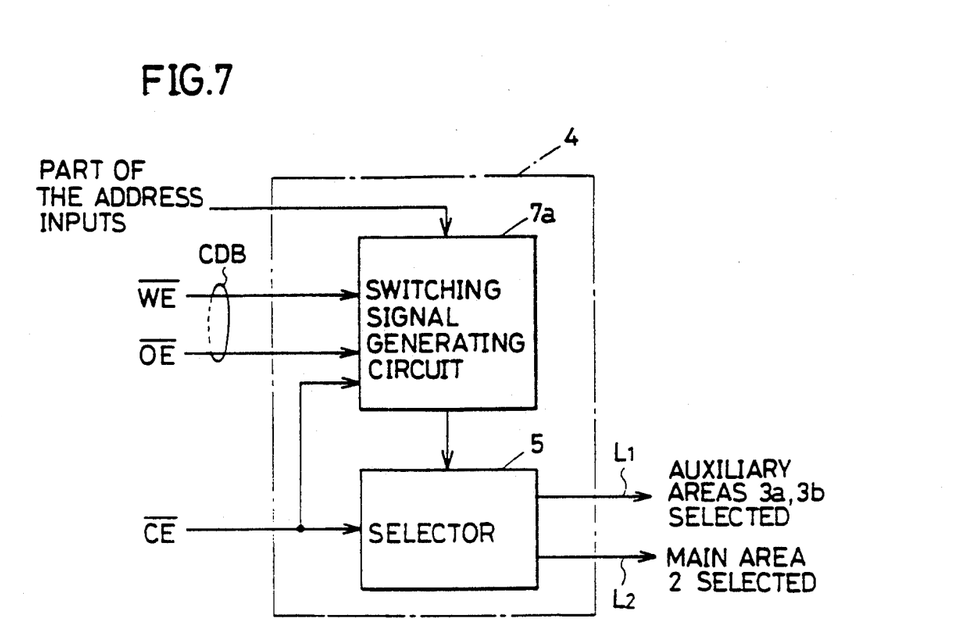
FIG. 7 is a view showing an example of the arrangement of the area switching means used in a static RAM or EEPROM.

FIG. 7 shows the arrangement of area switching means used in a static RAM or EEPROM. The switching signal generating signal 7a in FIG. 7 detects the timing for the switching of accessible storage areas on the basis of a chip enable signal $\overline{CE}$, a write enable signal $\overline{WE}$, and an output enable signal $\overline{OE}$.

Figure 8:
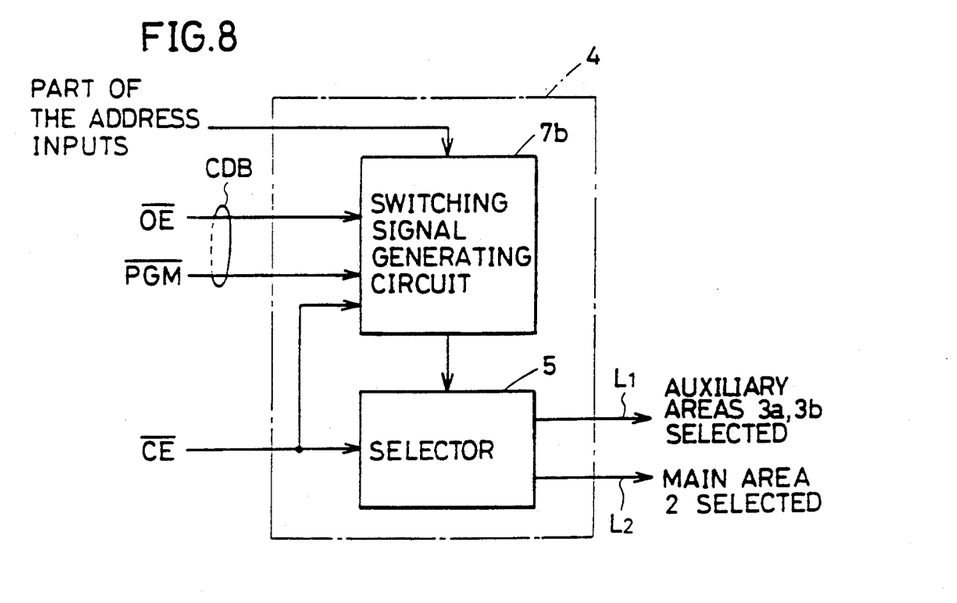
FIG. 8 is a view showing an example of the arrangement of the area switching means used in an EPROM or OTROM (one time PROM)

FIG. 8 shows the arrangement of area switching means used in an EPROM or OTPROM. The switching signal generating circuit 7b in FIG. 8 detects the timing for the switching of accessible storage areas on the basis of a chip enable signal $\overline{CE}$, a program input $\overline{PGM}$, and an output enable signal $\overline{OE}$.

Figure 9:
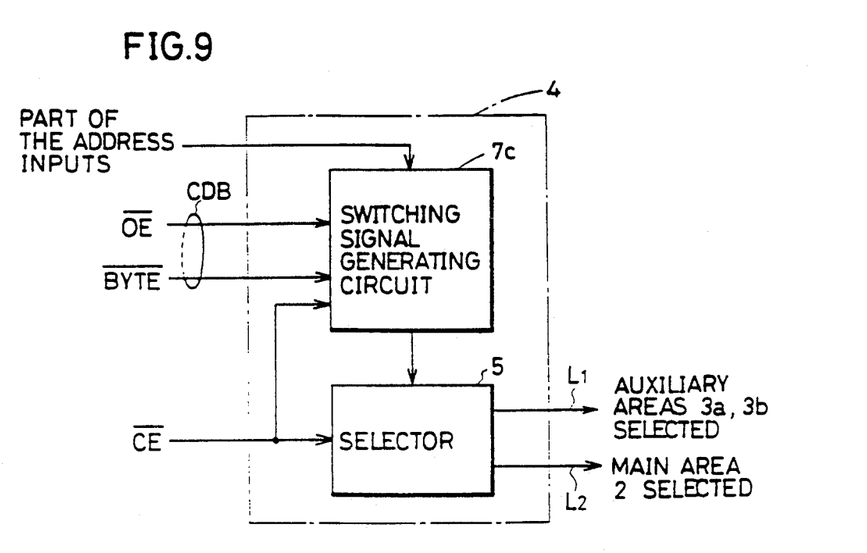
FIG. 9 is a view showing an example of the arrangement of the area switching means used in a masked ROM.

FIG. 9 shows the arrangement of area switching means used in a masked ROM. The switching signal generating circuit 7c in FIG. 9 detects the timing for the switching of accessible storage areas on the basis of a chip enable signal $\overline{CE}$, a byte switching signal $\overline{BYTE}$ and an output enable signal $\overline{OE}$.

Figure 10:
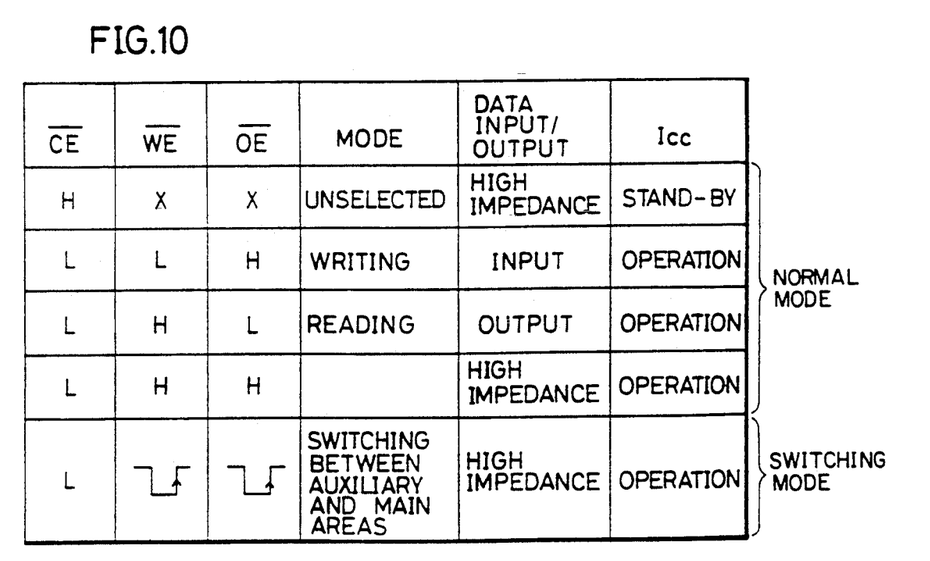
FIGS. 10 through 13 are diagrams showing the relation between the logical state of various control signals in the normal mode and the logical state of various control signals in the switching mode for an accessible storage area, with respect to various semiconductor storage devices.
Figure 11:
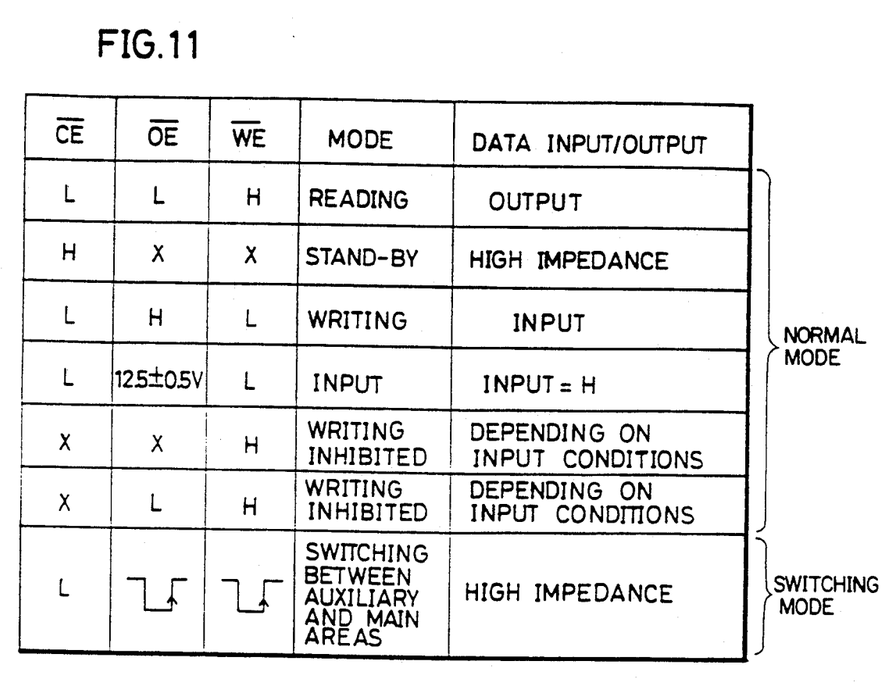
Figure 12:
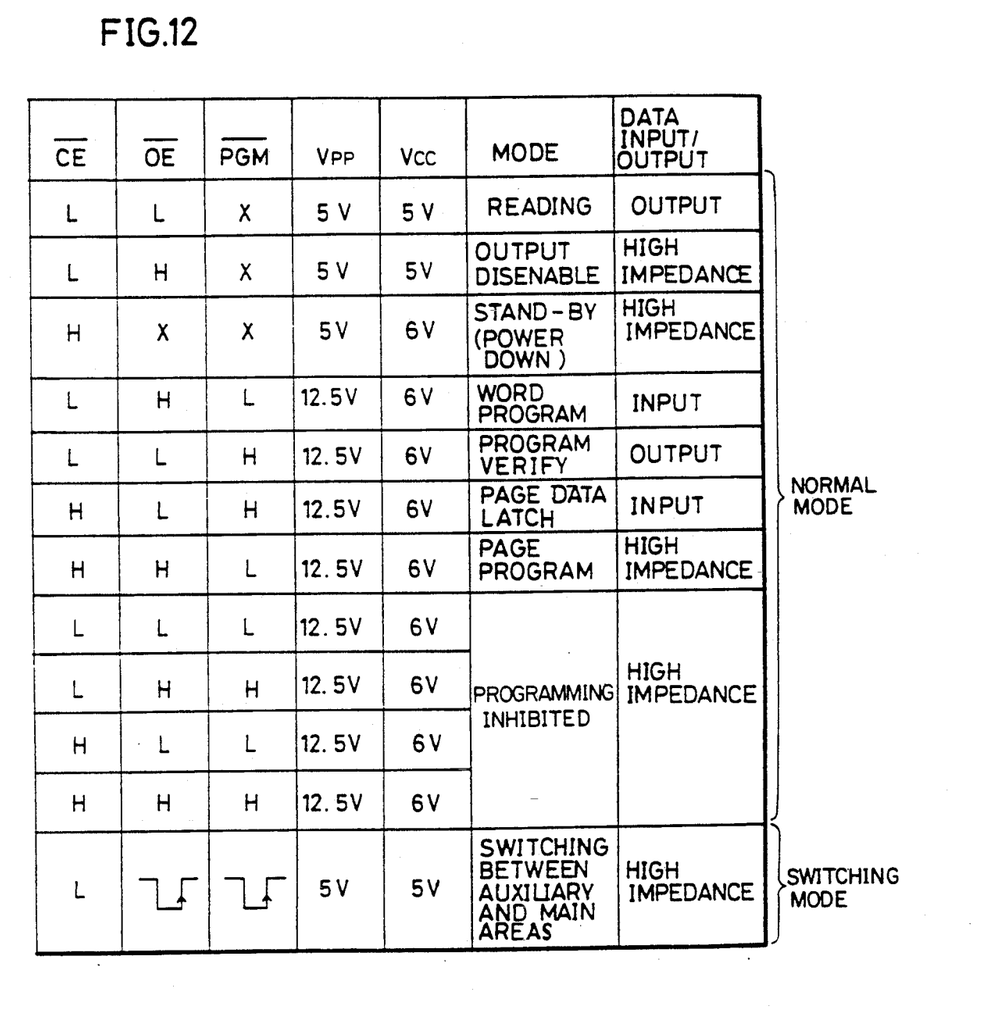
Figure 13:
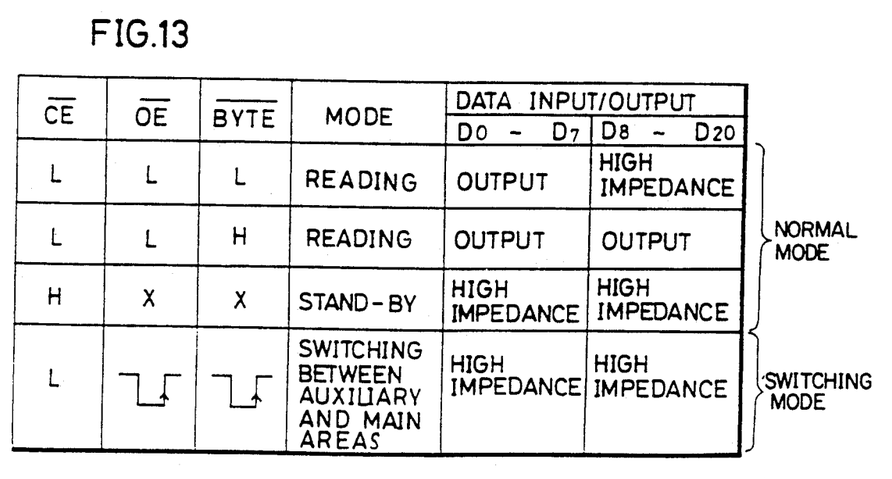

In addition, the switching signal generating circuits 7a through 7c shown in FIGS. 7 through 9 are each given part of the address inputs (for example, the least significant bit of the address inputs). Whether the accessible storage area is to be switched from the auxiliary areas 3a and 3b to the main area 2 or from the main area 2 to the auxiliary areas 3a and 3b is controlled on the basis of part of the address inputs. The switching signal generating circuits 7a through 7c generate a switching signal which a group of control signals given to each of them form a predetermined logical combination. That is, since control signals are used for control of operation in the normal mode of the semiconductor storage device, the device must be capable of distinguishing between such normal control mode and the accessible storage area switching mode. Therefore, each of the switching signal generating circuits 7a through 7b is adapted to be triggered when a group of control signals given thereto assumes a predetermined special logical state. FIGS. 10 through 13 show the relation, for the respective semiconductor storage devices, between combinations of control signals used in the normal mode and combinations of control signals used in the accessible storage area switching mode. FIG. 10 refers to a static RAM, FIG. 11 to an EEPROM, FIG. 12 to an EPROM and OTPROM, and FIG. 13 refers to a masked ROM. In addition, in FIGS. 10 through 13, X indicates that any of the "L" and "H" levels may be used. As a typical example, the static RAM shown in FIG. 10 will be described. The switching signal generating circuit 7a is adapted to generate a write enable signal $\overline{WE}$ when the chip enable signal $\overline{CE}$ is at "L" level, and it generates a switching signal when the output enable signal $\overline{OE}$ rises from "L" to "H" level.

Figure 14:
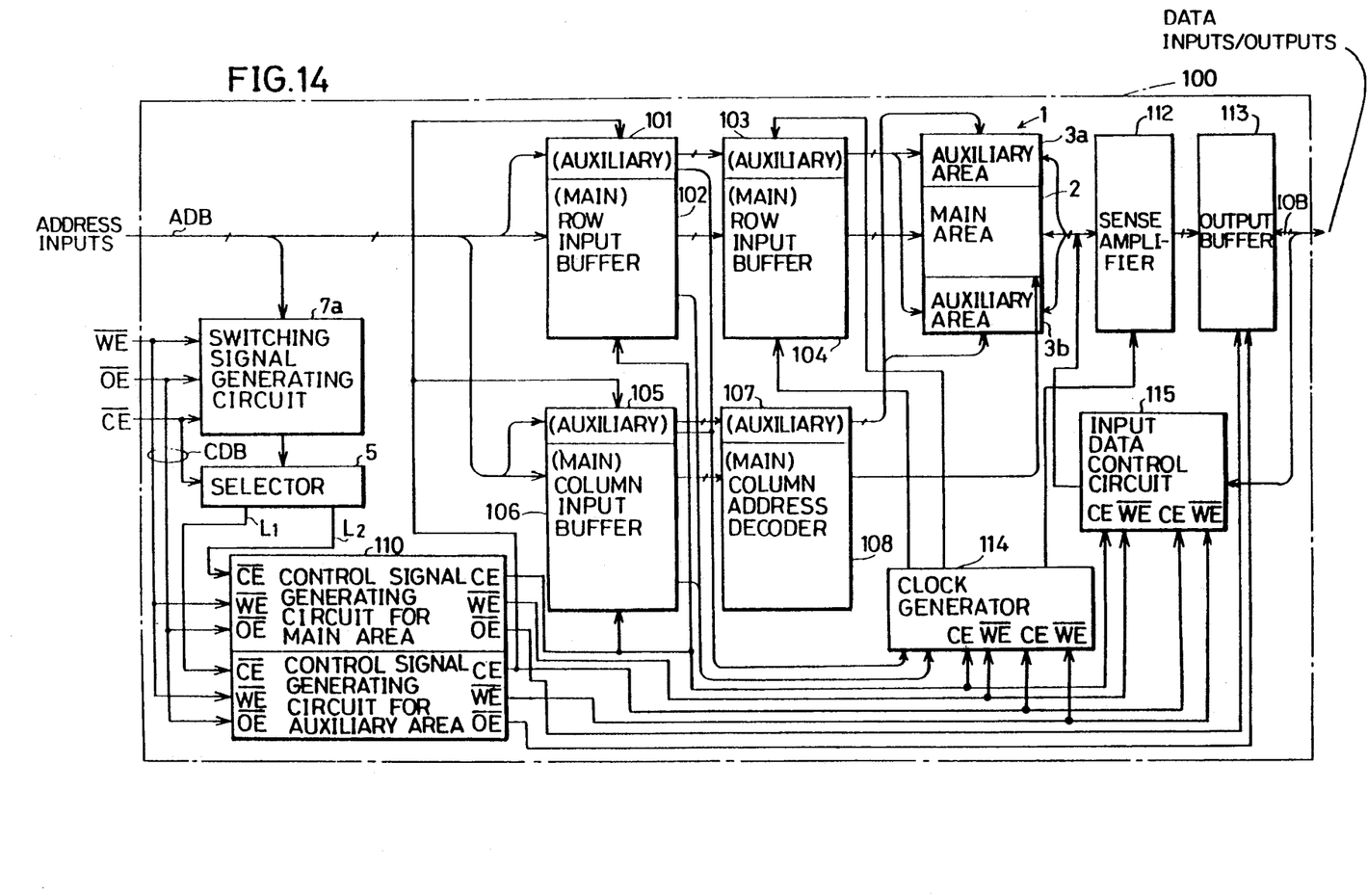
FIG. 14 is a block diagram of a static RAM chip constructed using the area switching means shown in FIG. 7.

FIG. 14 is a block diagram showing the entire arrangement of the static RAM used in the area switching means shown in FIG. 7. In the figure, address inputted from outside a semiconductor chip 100 are given to the address bus ADB. Row address inputs which are part of said address flowing through the address bus ADB are given to a row address decoder 104 for the main area through a row input buffer 102 for the main area. Further, part of the row address inputs are given to a row address decoder 103 for the auxiliary areas through a row input buffer 101 for the auxiliary areas. On the other hand, column address inputs which are part of the address flowing through the address bus ADB are given to a column address decoder 108 for the main area through a column input buffer 106 for the main area. Further, part of the row address inputs are given to a row address decoder 103 for the auxiliary areas through a row input buffer 101 for the auxiliary areas. On the other hand, column address inputs which are part of the address flowing through the address bus ADB are given to a column address decoder 108 for the main area through a column input buffer 106 for the main area. Further, part of said column address inputs are given to a column address decoder 107 for the auxiliary areas through a column input buffer 105 for the auxiliary areas. The row and column address decoders 104 and 108 for the main area respectively decode the row and column address inputs to select one memory cell in the main area 2 of the memory cell array 1. The row and column address decoders 103 and 107 for the auxiliary areas respectively decode part of the row address inputs and part of column address inputs and select one memory cell in the auxiliary areas 3a and 3b in the memory cell array 1. The main area 2 and auxiliary areas 3a and 3b are connected to the output buffer 113 through a sense amplifier 112. The sense amplifier 112 amplifies data written in or read from the memory cell array 1. The output buffer 113 is connected to a data input/output pin (not shown) through the input/output data bus IOB. And the output buffer 113 inputs data given from outside the semiconductor chip 100 as write data and outputs data read from the memory cell array 1 to the outside through the input/output data bus IOB.

The control signals inputted from outside the semiconductor chip 100, i.e., the chip enable signal $\overline{CE}$, write enable signal $\overline{WE}$ and output enable signal $\overline{OE}$ (these signals become active at "L" level) are given to the switching signal generating circuit 7a. Further, the switching signal generating circuit 7a is given the least significant bit in the address inputs flowing through the address inputs bus ADB. The output from the switching signal generating circuit 7a is given to the selector 5. The selector 5 is also given the chip enable signal $\overline{CE}$. One output from the selector 5 is given to the control signal generating circuit 110 for the main area through the selection signal line L2, and the output is given to the control signal generating circuit 111 for the auxiliary areas through the selection signal generating line L1. Further, the control signal generating circuit 110 for the main area is given the write enable signal $\overline{WE}$ and output enable signal $\overline{OE}$ from the outside. Similarly, the control signal generating circuit 111 for the auxiliary areas is given the write enable signal $\overline{WE}$ and output enable signal $\overline{OE}$ from the outside. These control signal generating circuits 110 and 11 for the main and auxiliary areas are adapted to convert the control signals from the outside into control signals suitable for the internal circuit. The chip enable signal $\overline{CE}$ (which becomes active at "H" level) from the control signal generating circuit 110 for the main area is given as an on-off control signal to the row and column input buffers 102 and 106 for the main area. That is, the row and column input buffers 102 and 106 for the main area have their conduction/nonconduction controlled by the chip enable signal CE. On the other hand, the chip enable signal CE (which also becomes active at "H" level) from the control signal generating circuit 111 for the auxiliary areas is given as an on-off control signal to the row and column input buffers 101 and 105 for the auxiliary areas. That is, the row and column input buffers 101 and 105 for the auxiliary areas have their conduction/nonconduction controlled by the chip enable signal CE. The chip enable signals CE from the control signal generating circuits 110 and 111 for the main and auxiliary areas are given to the clock generator 114 and input data control circuit 115. The write enable signals $\overline{WE}$ from the control signal generating circuits 110 and 111 for the main and auxiliary areas are given to the clock generator 114 and input data control circuit 115. The clock generator 114 is adapted to output various clock signals on the basis of control signals given thereto. clock signals from the clock generator 114 are given to the row address decoder 104 for the main area, row address decoder 103 for the auxiliary areas, and sense amplifier 112. The input data control circuit 115 controls the data input/output buffer IPB on the basis of control signals given thereto. The output enable signals $\overline{OE}$ from the control signal generating circuits 110 and 11 for the main and auxiliary areas are given to the output buffer 113. The output buffer 113 effects input/output control of data on the basis of the two output enable signals $\overline{OE}$ given thereto.

Figure 15:
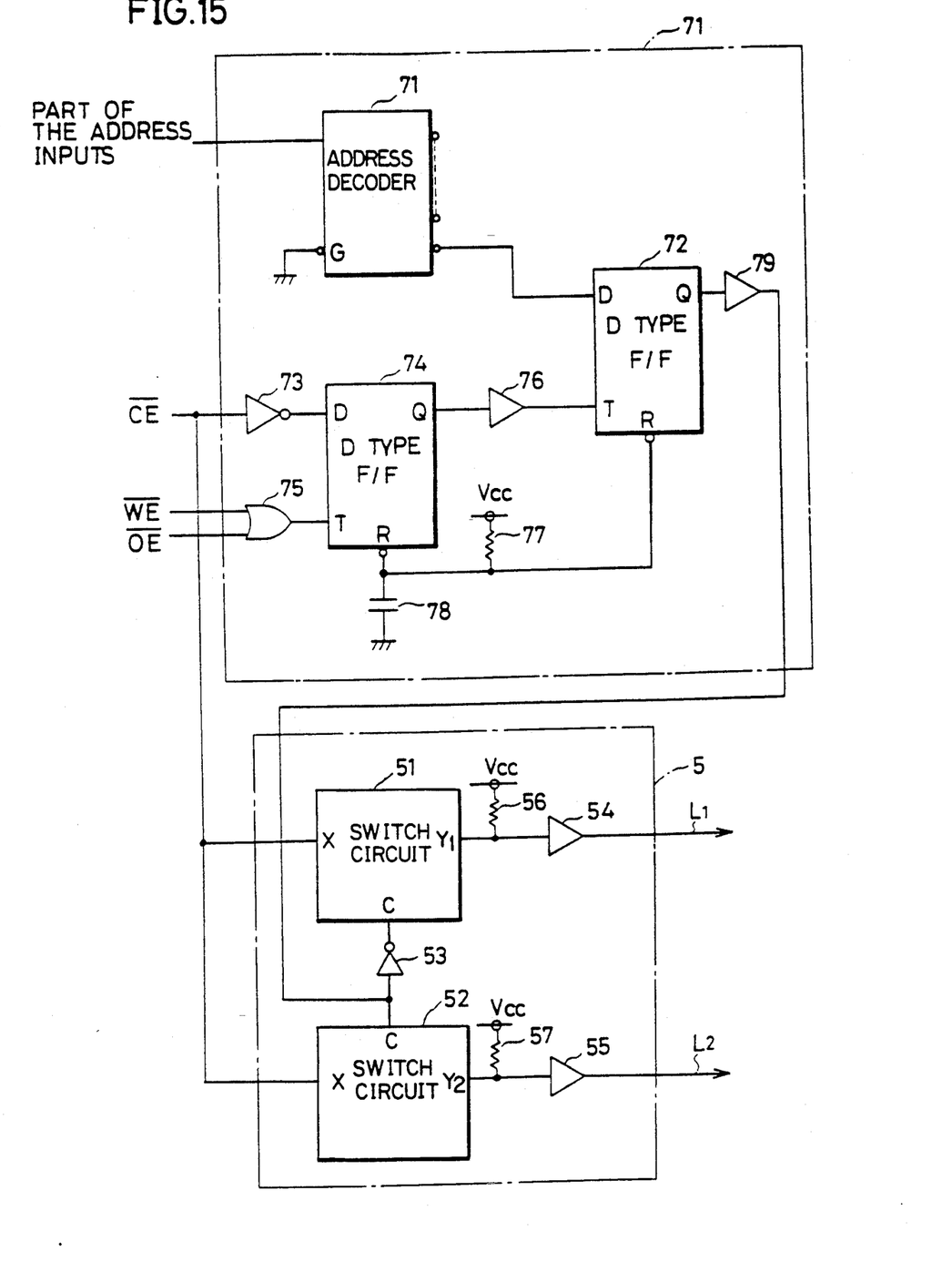
FIG. 15 is a block diagram showing in more detail the arrangement of the switching signal generating circuit and selector in FIG. 14.

FIG. 15 is a block diagram showing an example of the arrangement of the switching signal generating circuit 7a and selector 5 used in the embodiment of FIG. 14. In the figure, the switching signal generating circuit 7a comprises an address decoder 71, D-type flip-flops 72 and 74, an inverter 73, an OR gate 75, buffers 76 and 79, a power resetting resistor 77, and a power resetting capacitor 78. On the other hand, the selector 5 comprises switch circuits 51 and 52, an inverter 53, buffers 54 and 55, and pull-up resistors 56 and 57.

Figure 16:
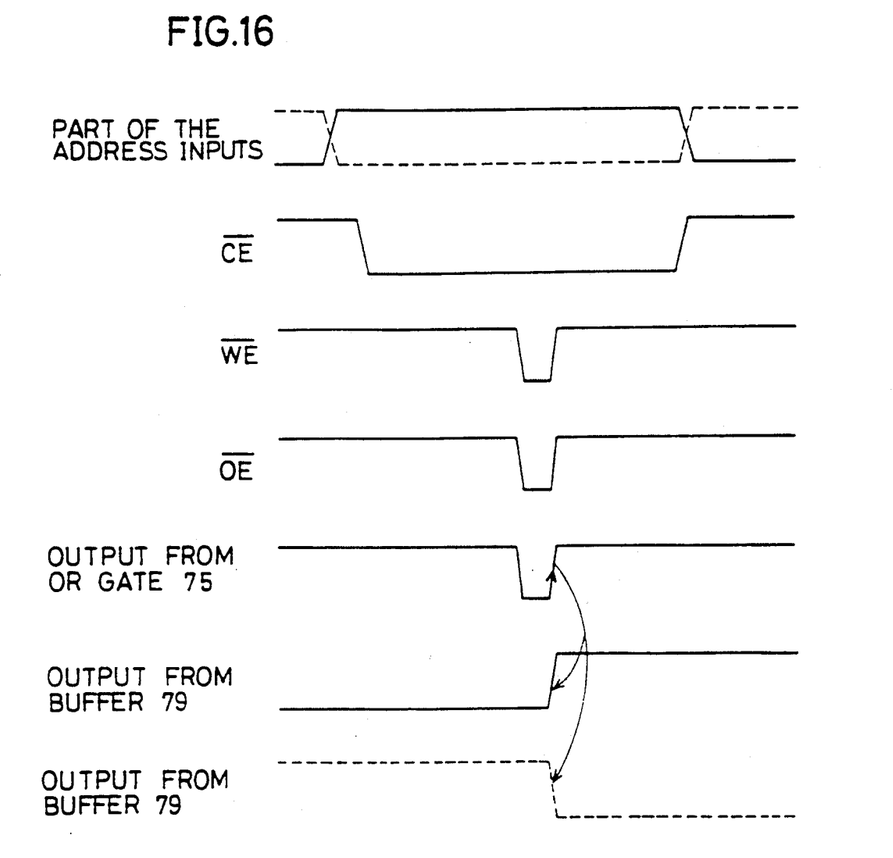
FIG. 16 is a timing chart for explaining the operation of the embodiment shown in FIGS. 14 and 15.

Referring to the timing chart shown in FIG. 16, the operation of the embodiment shown in FIGS. 14 and 15 will be described.

First, the operation in the initial state immediately after the turning-on of the power will be described. When the power for the semiconductor chip 100 is turned on, the potential at the R terminal (reset terminal) of the D-type flip-flops 72 and 74 instantaneously assumes "L" level by the action of the power resetting resistor 77 and power resetting capacitor 78 in the switching signal generating circuit 7a. For this reason, the D-type flip-flops 72 and 74 are reset. Therefore, the output from the Q terminal of the D-type flip-flop 72 assumes "L" level. This "L" level signal is given to the C terminal of the switch circuit 52 through the buffer 79. Further, the "L" level The output from the buffer 79 is inverted to "H" level by the inverter 53 and then given to the C terminal of the switch circuit 51. The switch circuits 51 and 52 have their input terminals (X terminals) and output terminal (Y1 terminal or Y2 terminal) rendered conductive (connected) when the potential at the C terminal is at "H" level and, reversely, open (nonconnected) when said potential is at "L" level. At this time, since the output from the buffer 79 is at "L" level, the potential at the C terminal of the switch circuit 51 is at "L" level. For this reason, in the switch circuit 51, the X and Y terminals are rendered conductive, and in the switch circuit 52, the X and Y terminals are opened. Therefore, the chip enable signal $\overline{CE}$ is outputted to the selection signal line L1 through the switch circuit 51 and buffer 54. On the other hand, since the Y2 terminal of the switch circuit 52 is floating, the potential at the selection signal line L2 is maintained at "H" level by the action of the pull-up resistor 57. If the chip enable signal $\overline{CE}$ given through the selection signal line L1 is active, i.e., at "L" level, the control signal generating circuit 111 for the auxiliary areas renders the chip enable signal CE active, i.e., brings it to "H" level. In response to the chip enable signal CE from the control signal generating circuit 111 for the auxiliary areas being at "H" level, the row and column input buffers 101 and 105 for the auxiliary areas are rendered conductive. On the other hand, since the selection signal line L2 is at "H" level, the control signal generating circuit 110 for the main area renders the chip enable signal CE inactive, i.e., brings it to "L" level. In response to the chip enable signal CE from the control signal generating circuit 110 for the main area being at "L" level, the row and column input buffers 102 and 106 for the main area are rendered conductive. Therefore, the row and column address decoders 104 and 108 for the main area have been given no address data and dare not effecting the coding operation. On the other hand, the row and column address decoder for the auxiliary areas have been given address inputs therefore, selection of memory cells in the auxiliary areas 3a and 3b is effected. That is, at this time, access to the main area 2 is inhibited, while only access to the auxiliary areas 3a and 3b is allowed. The writing or reading of data in or from the auxiliary areas 3a and 3b are effected through the sense amplifier 112 and output buffer 113.

A description will now be given of the operation for switching the accessible storage area form the auxiliary areas 3a and 3b to the main area 2. The address decoder 71 for the switching signal generating circuit 7a decodes part of the address inputs and causes one of the plurality of output signals to assume "L" level. As an example, suppose that the address decoder 71 has been given only the least significant bit signal A0 has been given. When this least significant bit signal A0 is at "L" level, one of the plurality of output signals from the address decoder 71 is selectively given to the D-type flip-flop 72, said selected output signal alone assuming "L" level. On the other hand, when the least significant bit signal A0 is at "H" level, the other output signals assume "L" level; therefore, the output signal to be given to the D terminal of the D-type flip-flop 72 assumes "H" level. Thus, to switch the accessible storage area from the auxiliary areas 3a and 3b to the main area 2, the least significant bit signal A0 assumes "H" level from outside the chip and the chip enable signal $\overline{CE}$ assumes "L" level, whereupon "L" pulses are simultaneously given from outside the chip to write enable signal $\overline{WE}$ and output enable signal $\overline{OE}$. When the OR gate 75 detects the rising edge of either the write enable signal $\overline{WE}$ or the output enable signal $\overline{OE}$, its output rises to "H" level. The output from the OR gate 75 is given to the T terminal of the D-type flip-flop 74. Therefore, at the rising edge in the OR gate 75, the D-type flip-flop 74 latches the signal inputted to its D terminal. At this time since the chip enable signal $\overline{CE}$ is at "L" level, the D terminal of the D-type flip-flop 74 has been given an "H" level signal inverted by the inverter 73. Therefore, the D-type flip-flop 74 latches the "H" level signal. As a result, the output signal from the Q terminal of the D-type flip-flop 74 changes from "L" level which it had in the initial state (upon the turning-on of the power) to "H" level. The output from the Q terminal of the D-type flip-flop 74 is given to the T terminal of the D-type flip-flop 74. For this reason, the input signal to the T terminal of the D-type flip-flop 72 rises from "L" level to "H" level. Thus, at the rising edge of the signal inputted to the T terminal of the D-type flip-flop 72, the signal inputted to the D terminal, i.e., the "H" level signal given from the address decoder 71 i switched. Therefore, the output signal form the Q terminal of the D-type flip-flop 72 assume "H" level. For this reason, the potential at the C terminal of the switch circuit 51 is rendered nonconductive (open), while the switch circuit 52 is rendered conductive. Therefore, the chip enable signal $\overline{CE}$ is outputted to the selection signal line L2 through the switch circuit 52 and buffer 55. On the other hand, the selection signal line L1 is maintained at "H" level by the action of the pull-up resistor 56. In response thereto, the chip enable signal CE at "H" level is outputted from the control signal generating circuit 110 for the main area, while the chip enable signal CE at "L" level is outputted from the control signal generating circuit 111 for the auxiliary areas. In response to the chip enable signal CE at "H" level from the control signal generating circuit 110 for the main are, the row and column input buffers 102 and 106 for the main area are rendered conductive. On the other hand, in response to the chip enable signal CE at "L" level form the control signal generating circuit 111 for the auxiliary areas, the row and column input buffers 101 and 105 for the auxiliary areas are rendered nonconductive. Therefore, since address inputs are given only to the row and column address decoders 104 and 108 for the main area, access to the main area 2 becomes possible, while access to the auxiliary areas 3a and 3b is inhibited.

The operation for switching the accessible storage area from the main area 2 to the auxiliary areas 3a and 3b will now be described. In this case, the least significant bit signal A0 to be given to the address decoder 71 is caused to assume "L" level, and "L" level pulses are given to the write enable signal $\overline{WE}$ and output enable signal $\overline{OE}$. Under these conditions, as when in dotted lines in FIG. 16, the output from the buffer 79 assumes "L" level and an operation directly opposite to the described one for switching from the auxiliary areas 3a and 3b to the main area 2 is performed. In addition, the details of this operation will be readily understood by reference to the described operation for switching from the auxiliary areas 3a and 3b to the main area 2; therefore, a description thereof will be omitted.

An example in which this invention is applied to a portable semiconductor storage device such as a memory card will now be described.

Figure 17:
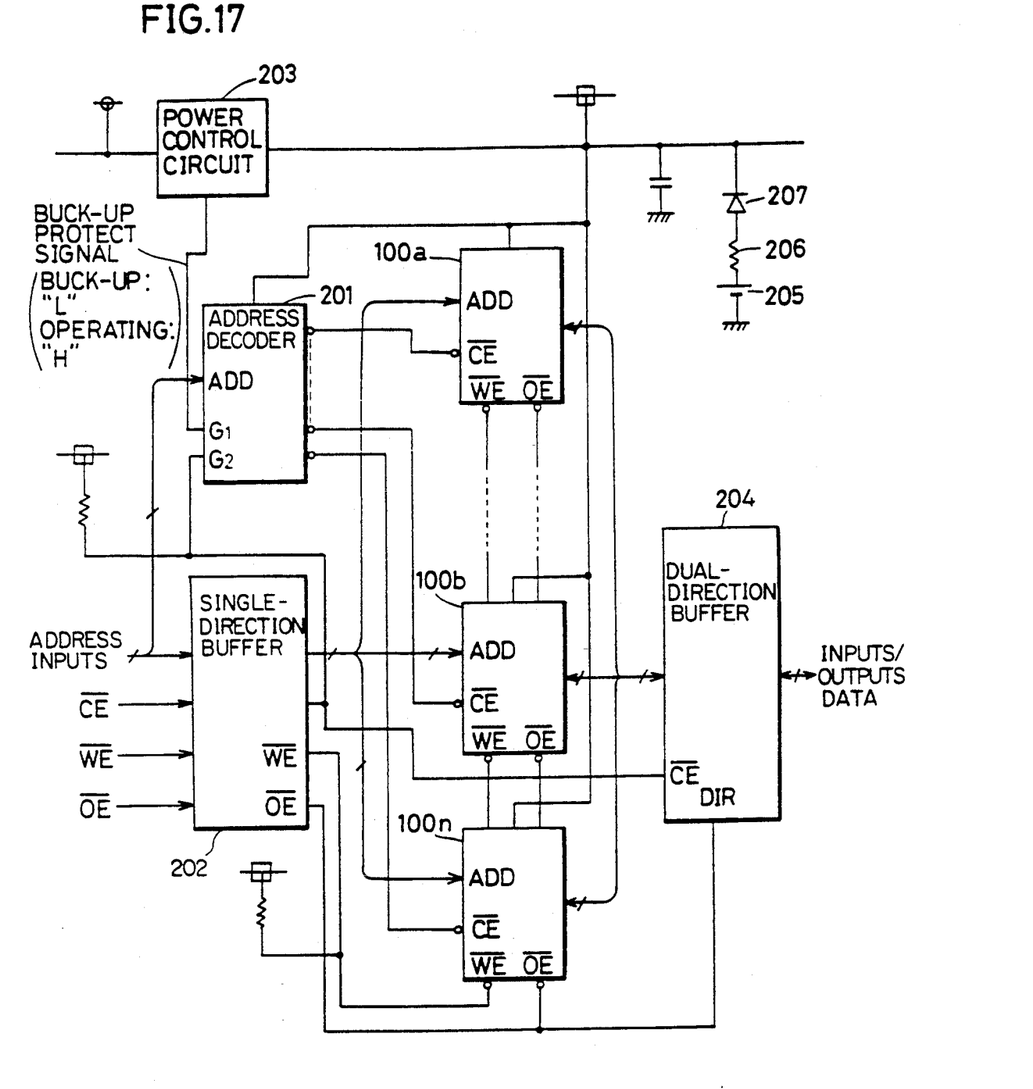
FIG. 17 is a block diagram showing a memory card circuit assembly constructed using a plurality of static RAM chips shown in FIG. 14.

FIG. 7 shows an example of the arrangement of a memory card circuit assembly constructed by using a plurality of static RAM chips shown in FIG. 14. In the figure, this memory card circuit assembly is provided with a plurality of static RAM chips 100a through 100n. The static RAM chips 100a through 100n are of the same construction as the static RAM chip 100 shown in FIG. 14. The selection of these static RAM chips 100a through 100n is effected by an address decoder 201. The address decoder 201 effects selection of static RAM chips by suing part of the address inputs. In each of the static RAM chips 100a through 100n, a selection signal from the address decoder 201 acts as a chip enable signal $\overline{CE}$. The memory card circuit assembly as shown in FIG. 17 is carried by the user when not in use, and when it is used it is connected to the terminal unit of the system. Provided by the terminal unit are a power source, address inputs, various control signals (chip enable signal CE, write enable signal $\overline{WE}$ and output enable signal $\overline{OE}$) and write data. Par of the address data are given to the address decoder 201, as described above. Further, the address data are given to the static RAM chips 100a through 100n through a single-direction three-state buffer 202. Similarly, the write enable signal $\overline{WE}$ and output enable signal $\overline{OE}$ are given to each of the static RAMs 100a through 100n through the single-direction three-state buffer 202. The chip enable signal $\overline{CE}$ is given to the address decoder 201 and dual-direction three-state buffer 204 through the single-direction three-state 202. Transfer of write data and read data between each of the static RAM chips 100a through 100n and the terminal unit is effected through the dual-direction three-state buffer 204. This dual-direction three-state buffer 204 has its direction of data transfer switched according to the level of the output enable signal $\overline{OE}$ given to the DIR terminal. In the case where the power has been stably inputted from the terminal unit, the power input is given to each circuit in the memory card circuit assembly. On the other hand, if the power input from the terminal unit is unstable or there is no power input therefrom, the power control circuit 203 blocks the power path extending from the terminal unit. At this time, the voltage of a battery 205 provided in the memory card circuit assembly is given to each circuit in the memory card circuit assembly.

In the arrangement described above, when the power is turned on, the memory cell array 1 in each of the static RAM chips 100a through 100n has its auxiliary areas 3a and 3b selected as accessible storage areas. Therefore, the terminal unit alternately selects the static RAM chips 100a through 100n by the address decoder 201, whereby the access to the auxiliary areas 3a and 3b in any static RAM chip is possible. When it is desired to access all main areas 2, the terminal unit successively selects the static RAM chips 100a through 100n and switches the accessible storage area from the auxiliary areas 3a and 3b to the main area 2. That is, the selection signal to the static RAM chip selected by the address decoder 201, i.e., the chip enable signal $\overline{CE}$ alone assumes "L" level, while the chip enable signals $\overline{CE}$ to the unselected static RAM chips assume "H" level, and switching to the accessible storage area is effected in the selected static RAM chip. Further, the static RAM chips 100a through 100n can be used in such a manner that some of them have their auxiliary areas 3a and 3b selected and others have their main areas 2 selected.

As has so far been described, according to the invention, any desired identification data can be stored in the auxiliary areas without sacrificing the storage capacity of the main area. Further, since the auxiliary areas can be accessed by using part of the address inputs used for accessing the main area, there is no possibility of any increase in the number of bits of the address inputs making it possible to avoid an increase in chip area or in cost. Further, there is no possibility of an increase in the number of input pins for address inputs, and interchangeability with standardized semiconductor storage device is not spoiled.

Although the present invention has been described and illustrated in detail, it is clearly understood that the same is by way of illustration and example only and is not to be taken by way of limitation. the spirit and scope of the present invention being limited only by the terms of the appended claims.

What is claimed is:

1. A semiconductor storage device comprising:
   a memory cell array with a single storage area composed of a plurality of regularly arranged memory cells, said storage area being divided into a main area of relatively large storage capacity and auxiliary areas of relatively small storage capacity,
   said main area being accessible through first address inputs,
   said auxiliary areas being accessible through second address inputs which are part of said first address inputs, and
   an area switching circuit for selective switching between said main area and said auxiliary areas.

2. A semiconductor storage device as set forth in claim 1, wherein:
   said area switching circuit executes the switching a predetermined time after the turning-on of said the power.

3. A semiconductor storage device as set forth in claim 2, wherein:
   said area switching circuit includes timer means for detecting the passage of a predetermined time after the turning-on of the power, the switching storage are being executed in response to the output from said timer means.

4. A semiconductor storage device as set forth in claim 1, wherein:
   said area switching circuit executes the switching of said in response to a signal given from outside the semiconductor chip on which it is mounted.

5. A semiconductor storage device as set forth in claim 4, wherein;
   the signal given from outside the semiconductor chip is an exclusive switching control signal for giving a command for said switching of accessible areas.

6. A semiconductor storage device as set forth in claim 4, wherein
   the signal given from outside the semiconductor chip is a group of control signals for controlling the timing for the writing of data into and reading of data from said memory cell array, and
   said area switching circuit executes the switching said when said group of control signals have a predetermined logical combination.

7. A semiconductor storage device as set forth in claim 1, including:
   first address designating means for designating the address of a first fixed length of said main area by said first address inputs, and
   second address designating means for designating the address of a second fixed length of said auxiliary areas by said second address inputs,
   said area switching circuit including means for selectively activating said first and second address designating means.

8. A method of accessing a semiconductor storage device, comprising the steps of:
   dividing a single storage area of a memory cell array composed of a plurality of regularly arranged memory cells, into a main area of relatively large storage capacity and auxiliary areas of relatively small storage capacity, and
   accessing said main area by using first address data, accessing said auxiliary areas by using second address data which are part of said first address data, wherein said accessing is effected by switching between said main area and said auxiliary areas.

* * * * *